United States Patent
Alshammari

(10) Patent No.: US 9,628,273 B2
(45) Date of Patent: Apr. 18, 2017

(54) CRYPTOGRAPHIC METHOD AND SYSTEM FOR SECURE AUTHENTICATION AND KEY EXCHANGE

(71) Applicant: Thamir Alshammari, W Henrietta, NY (US)

(72) Inventor: Thamir Alshammari, W Henrietta, NY (US)

( * ) Notice: Subject to any disclaimer, the term of this patent is extended or adjusted under 35 U.S.C. 154(b) by 339 days.

(21) Appl. No.: 14/266,370

(22) Filed: Apr. 30, 2014

(65) Prior Publication Data
US 2015/0319149 A1  Nov. 5, 2015

(51) Int. Cl.
*H04L 29/06* (2006.01)
*H04L 9/08* (2006.01)
*H04L 9/32* (2006.01)

(52) U.S. Cl.
CPC .......... *H04L 9/0869* (2013.01); *H04L 9/0844* (2013.01); *H04L 9/3247* (2013.01); *H04L 63/0457* (2013.01); *H04L 63/061* (2013.01)

(58) Field of Classification Search
CPC ... H04L 9/0869; H04L 63/061; H04L 9/3247; H04L 63/0457; H04L 9/0844
See application file for complete search history.

(56) References Cited

U.S. PATENT DOCUMENTS

| | | | | |
|---|---|---|---|---|
| 5,241,599 | A * | 8/1993 | Bellovin | H04L 9/0844 380/28 |
| 7,047,408 | B1 | 5/2006 | Boyko et al. | |
| 8,391,841 | B2 | 3/2013 | Semple et al. | |
| 2002/0051537 | A1 * | 5/2002 | Rogaway | H04L 9/0643 380/46 |

OTHER PUBLICATIONS

Hwang et al "Provably secure three party authenticated quantum key distribution protocols." IEEE Transactions on dependable and secure computing. Jan.-Mar. 2007. p. 71-80.*
IEEE xplore Digital Library, Integrity Sci. Inc., USA, "Extended password key exchange protocols immune to dictionary attack", Jablon, D.P. 1997. http://ieeexplore.ieee.org/xpl/articleDetails.jsp?arnumber=630822&sortType%3Dasc_p_Sequence%26filter%3DAND%28p_1_S_Number%3A13703%29 , (1 Page).

* cited by examiner

*Primary Examiner* — Kendall Dolly
(74) *Attorney, Agent, or Firm* — Oblon, McClelland, Maier & Neustadt, L.L.P.

(57) ABSTRACT

A method and algorithm of authentication between parties includes receiving a randomly generated binary string. A shared secret of the parties is combined with the randomly generated binary string to form a new binary string. A binary pair (A, B) is initiated; a first bit of the new binary string is read. A current value of B is added to A when the read bit is zero, and a current value of A is added to B when the read bit is one. A next bit of the new binary string is read. The steps of adding the current values and reading a next bit are repeated until all bits have been read. A resulting binary pair (A, B) is returned after all of the bits have been read. Ephemeral Diffie-Hellman public keys are securely exchanged between the parties. Challenge responses are exchanged and a session key is agreed upon.

15 Claims, 9 Drawing Sheets

CRYPTOGRAPHIC METHOD AND SYSTEM FOR SECURE AUTHENTICATION AND KEY EXCHANGE

GRANT OF NON-EXCLUSIVE RIGHT

This application was prepared with financial support from the Saudia Arabian Cultural Mission, and in consideration therefore the present inventor(s) has granted The Kingdom of Saudi Arabia a non-exclusive right to practice the present invention.

BACKGROUND

Field of the Disclosure

The present disclosure generally relates to secret-key/public-key cryptography, and more specifically to a method and system for providing challenge-response mutual authentication, using encrypted Diffie-Hellman key exchange, based on a symmetric key or zero-knowledge proofs.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

The term authentication is defined herein as the process of verifying the identity of a person, program, device, or entity. It is the process of determining whether someone or something is, in fact, who or what it is declared to be. Consider two parties, Alice and Bob, sharing a secret S. Bob who plays the trusted authenticator role would like to authenticate Alice's identity over an insecure channel based on knowledge of S. An adversary Eve, without knowledge of S, should not be able to persuade Bob that she knows S. This type of authentication is known as traditional symmetric key authentication. Authentication can be accomplished using any one or a combination of three factors: what the user is (e.g. fingerprints), what the user has (e.g. smartcards), and what the user knows (e.g. passwords).

The last factor, known as direct password authentication, is the most widely implemented in single factor authentication mechanisms because of the low cost, low requirements, and easy replacement. However, users may choose bad passwords because they are easy to remember, such as date of birth, phone number, or dictionary words. Thus, authenticating users' identities to systems over an insecure network with just a user's ID and password is prone to active and passive attacks.

In an active attack, the adversary guesses a password from a list of dictionary words, known as a dictionary attack, and initiates an authentication attempt with an honest party. If the authentication attempt is successful, the attacker considers the guessed password is correct. However, this attack can easily be thwarted using password lockout mechanisms that lock out the user account after a certain number of invalid login attempts. On the other hand, a passive attack that is difficult to detect can occur when an adversary attempts to mount a dictionary attack or a brute force attack against a password, based on observed messages. Brute force attacks consume a lot of resources and time compared to dictionary attacks, which search through only possibly meaningful words.

To mitigate the risk of active and passive attacks against secret-based authentication systems, the authentication system can implement a challenge-response authentication mechanism. Challenge-response authentication is a mechanism in which one party presents a challenge and another party must provide a valid response to be authenticated.

Challenge-Handshake Authentication Protocol (CHAP), as the name indicates, is a challenge-based authentication mechanism which can authenticate either the client to the server or vice versa, or even extend the authentication phase in both directions and provide mutual authentication. Authenticating a client's identity begins from a server, which generates a random challenge that must be different every time and assigns it a unique challenge identifier, and then sends both the challenge and the identifier to the client. The server also includes its ID in the request so that the client knows to whom it is authenticating. The client concatenates the challenge identifier, the user password, and the random server challenge, and then calculates a MD5 hash (a cryptographic hash function expressed as a hexadecimal number) from the resultant string. This hash, along with the plaintext username, is sent to the server as a valid challenge-response. Both the client and the server calculate the same hash and compare the results to acknowledge successful authentication. CHAP provides protection against replay attacks through the use of an incrementally changing identifier and a variable challenge-value. CHAP is an authentication scheme implemented in communication protocols, such as Point to Point Protocol (PPP) and Link Control Protocol (LCP).

CHAP provides security against replay attacks due to the changing nature of the challenge, which should be unique for every exchange. However, CHAP requires the authentication server to use a password in the clear text format unless encryption is used, which means compromising the CHAP authentication server would result in compromising all user passwords. CHAP is vulnerable to offline attacks if the CHAP authentication is performed over a non-encrypted channel. If using strong passwords is not enforced, it would be feasible for an attacker to mount a brute force or a dictionary attack to recover the password by capturing one challenge/response exchange.

CRAM-MD5 stands for Challenge-Response Authentication Mechanism based on a keyed-hash message authentication code-MD5 (HMAC-MD5) algorithm. A client takes a server up on its offer and returns an AUTH CRAM-MD5 command. The server returns a challenge, which is random data. The client then responds with its username, a space, and a hash value, all of which is base64 encoded. The digest is the output of the HMAC with the MD5 hash function, using the shared secret and the server's challenge as inputs. When the server receives the client's response, it matches the hash value presented to the one it computes over the same data. If the two match, then access is granted. CRAM-MD5 is widely implemented as an authentication method for the email mailbox-management protocols POP and IMAP. Also, CRAM-MD5 is supported by Simple Authentication and Security Layer (SASL).

CRAM-MD5 was designed to avoid having the password transit in cleartext. However, CRAM-MD5 is vulnerable to an offline attack. If the attacker can eavesdrop on the communication channel, a dictionary attack would be feasible to recover the password. Also, CRAM-MD5 does not support mutual authentication, since it provides just client authentication.

The Salted Challenge Response Authentication Mechanism (SCRAM) is a password-based authentication mechanism. SCRAM offers significant improvements over the previous password-based mechanisms, including a feature such as mutual authentication. The client sends the first message which contains a header, username, and a unique randomly generated nonce. The server sends the first message-containing parameters: user's iteration count, the user's salt, and its own nonce to the client. The client then responds by sending the client-final-message with the same nonce and a client proof computed using a symmetric hash function. The server verifies the client's challenge response. If the client's challenge response matches with its calculation, then the server sends a final message to the client, who in turn verifies the server's challenge response. SCRAM is used in Simple Authentication and Security Layer (SASL) mechanism negotiation applications such as Lightweight Directory Access Protocol (LDAP).

SCRAM itself does not provide security layers, which means that SCRAM is implemented in conjunction with Transport Layer Security (TLS) to provide confidentiality for the authentication exchange. It is clear that if SCRAM authentication exchange is performed over an unprotected channel, an eavesdropper can gain knowledge to mount an offline dictionary or a brute-force attack to recover the password.

Diffie-Hellman (DH) key exchange is a public-key encryption scheme. It is a cryptographic method that allows two parties that have no prior knowledge of each other to establish a shared secret key over an insecure communication channel. DH key exchange provides forward secrecy, if correctly implemented because no long-term private keying material exists to be disclosed. However, a classical DH method is an unauthenticated public-key exchange. The DH method does not authenticate exchanged messages which are subject to an active eavesdropper who is able to intercept and alter exchanged messages between the communication parties. By establishing an independent DH exchange with both parties (Alice, Bob), an eavesdropper can replace the DH public keys ($g^x$, $g^y$) with his own public key values ($g^{x'}$, $g^{y'}$). Thus, an eavesdropper successfully can impersonate Alice to Bob, and Bob to Alice because Alice will think that the secret key is $g^{xy'}$ and Bob will believe that it is $g^{x'y}$. This type of attack is known as Man-In-The-Middle (MITM).

SUMMARY

Embodiments include a computer-implemented method of authentication between parties. The method includes receiving a randomly generated binary string which has a pre-agreed integer value, and combining a shared secret of the parties with the randomly generated binary string to form a new binary string. The method also includes initiating a binary pair (A, B) with an initial value of ($A_0$, $B_0$), and reading a first bit of the new binary string. The method also includes adding a current value of B to A when the read bit is zero, and adding a current value of A to B when the read bit is one. The method also includes reading a next bit of the new binary string. The steps of adding the current values and reading a next bit are repeated, via a processor of a computing device, until all bits of the new binary string have been read. The method also includes returning a resulting binary pair (A, B) after all of the bits have been read, and securely exchanging ephemeral Diffie-Hellman (DH) public keys between the parties. The method also includes exchanging challenge responses and agreeing on a session key between the parties.

Embodiments also include a computer-implemented algorithm, that when executed on a computer processor, causes the computer processor to perform the following steps. The steps include receiving a binary string as input, and initiating a binary pair (A, B) with an initial value of ($A_0$, $B_0$). The steps also include reading one bit at a time of the received binary string, adding a current value of B to A when the bit reads zero, and adding a current value of A to B when the bit reads one. The steps also include outputting a final value of the binary pair (A, B), via the computer processor when all bits of the binary string have been read.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Referring now to the drawings, wherein like reference numerals designate identical or corresponding parts throughout the several views.

DETAILED DESCRIPTION OF THE EMBODIMENTS

Figure 1:
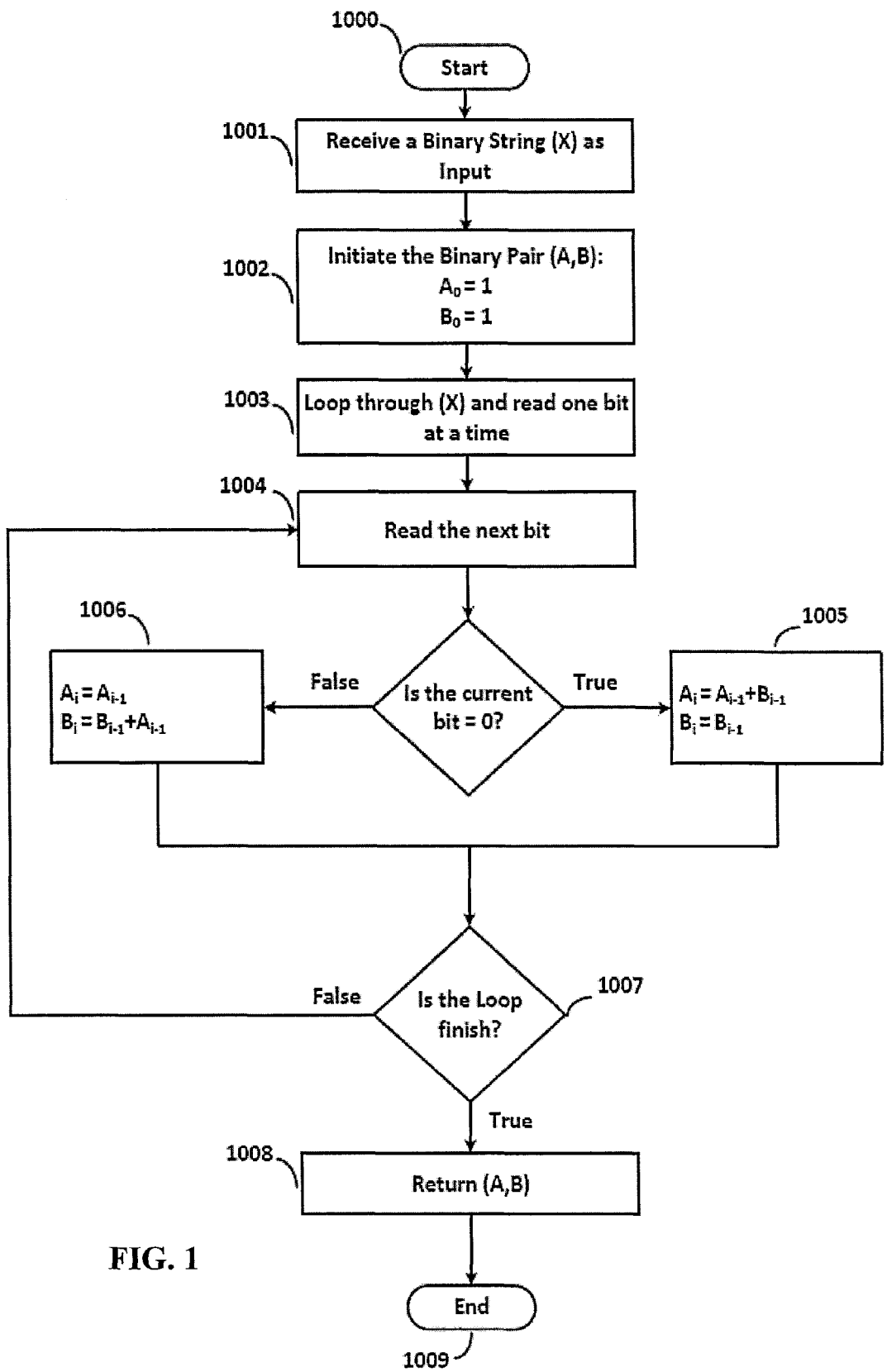
FIG. 1 is an algorithm of the operation of the BSCA function, according to one example.

In order to thwart a MITM attack, DH key exchange can be implemented in conjunction with a public key cryptosystem, such as RSA (named for the authors of the algorithm, Ron Rivest, Adi Shamir, and Leonard Adleman) to verify the identities of the communication parties. The present disclosure performs authenticated DH key exchange, based on a shared secret without the need for a third party or a public key cryptosystem. The exchanged DH public keys are encrypted with a combination of a random string and the shared secret, whereas the basic DH method does not.

The challenge-response mechanisms and DH key exchanges described above are vulnerable to active and passive attacks. However, the present disclosure overcomes the security issues associated with the challenge-response mechanisms and DH key exchange described above by providing a challenge-based mechanism for establishing secure and authenticated communication between two parties who shared a secret in advance. The system disclosed herein depends on three phases of exchanging messages. In selected embodiments, a first phase has the trusted authenticator randomly generate a string (M) and send it over to the other party who mixes it with the shared secret (S) in a specific way to generate a new string (R). By sending (R) in binary format to an algorithmic function described herein, the two parties can generate two dynamic large co-prime integers ($\alpha$, $\beta$), known as the Binary Pair, that have a modular multiplicative inverse (d). In selected embodiments, a second phase has both parties securely exchange ephemeral DH public keys in a method of digital encryption based on the fact ($\beta d \equiv 1 \mod \alpha$) derived from the first phase. A third phase has the two parties exchange valid challenge responses to be authenticated and agree on a session key. The first phase ensures that the two parties know the shared secret to achieve authentication, while the second phase allows the two parties to securely perform DH key exchange to avoid a Man-In-The-Middle attack.

It will be appreciated that the present disclosure represents a significant advance in the field of symmetric/public key cryptography. The present disclosure ensures confidentiality since an eavesdropper, who may capture the publicly exchanged messages, does not gain knowledge of the shared secret or the session key. In addition, the present disclosure offers perfect forward secrecy, which protects past session keys and secrets against future compromises.

The following notation will used throughout the present disclosure.

Alice, Bob: The two parties desiring to authenticate each other and agree on a session key over an insecure channel.

S: a shared secret between the two parties.

M: a random string of Length L publicly sent to the other party.

R: indicates a binary string (e.g. 1001101 . . . ).

L: a pre-agreed integer value.

SK: derived shared session key for secure communication.

P: a pre-agreed suitable large safe prime integer.

G: a pre-agreed primitive root modulo P, known as a generator.

($\alpha$, $\beta$): indicates dynamic integer values returned by the function BSCA( ) and not publicly revealed.

d: the multiplicative inverse of ($\beta \mod \alpha$)

(x, y, z): ephemeral private keys, generated randomly and not publicly revealed.

(X, Y, Z): corresponding public keys for (x, y, z), respectively.

C: corresponding encrypted key for either X or Y, exchanged publicly as a challenge.

CR: valid challenge response publicly sent to the other party to prove knowledge of the shared secret.

BSCA( ): a function that accepts a binary string (R) and returns the Binary Pair (A,B).

BF( ): a function that returns the binary representation of an input as a whole.

H( ): a cryptographic one-way hash function (e.g., SHA or MD5).

*: symbol indicates a multiplication operation.

+: symbol indicates an addition operation.

mod: symbol indicates a modular operation.

|: symbol indicates a string concatenation.

Prior to any communication being established, both parties must agree on a list of parameters and symmetric functions, which are recommended to be hardcoded into the authentication software at both ends. In selected embodiments, the parameters may meet the following conditions in order to establish a secure authentication.

L can be static and large enough to generate large outputs of the dynamic Binary Pair ($\alpha$, $\beta$) such that $\alpha$, $\beta > P$ P can be a large prime in the form $P=q2+1$ where q is also a prime.

The generator G can be a primitive root of P in $Z_p^*$.

A Binary Sequence Cumulative Algorithm (BSCA) is a mathematical process that draws a unique relation between binary strings and integers. BSCA introduces a new decimal representation of binary other than the power of 2. The power of a BSCA process is based on the addition mathematical operation. The BSCA function accepts a binary string as input and generates two unique relatively prime integers as output, called the Binary Pair (A, B). The main goal of BSCA is to generate large unreadable outputs in an integer format from short readable inputs in a binary format (e.g. ASCII).

Referring to FIG. 1, a BSCA Function performs the following steps in sequence to generate the Binary Pair (A,B).

Step 1000—the algorithm starting point.

Step 1001—accepts an input in a binary format (e.g. 1000110 . . . )

Step 1002—initiates the Binary Pair values ($A_0$, $B_0$) with 1.

Step 1003—loops through the input and reads one bit at a time.

Step 1004—reads the next bit.

Step 1005—if the current bit is 0, adds the current value of B to A and moves to the next step.

Step 1006—if the current bit is 1, adds the current value of A to B and moves to the next step.

Step 1007—reads the next bit if the loop is not finished.

Step 1008—if reading all the binary bits is finished, returns the Binary Pair (A,B) values.

Step 1009—end point of the algorithm.

BSCA can be defined as a function in the following way. An arbitrary binary string S of length $N \geq 1$ is given. Starting with $a_0=1$, $b_0=1$, from the sequences $\{a_0, a_1, a_2, \ldots, a_n\}$, $\{b_0, b_1, b_2, \ldots, b_n\}$. According to the following recursion relation:

$$\left. \begin{array}{l} a_i = a_{i-1} + b_{i-1} \\ b_i = b_{i-1} \end{array} \right\} s_i = 0$$

$$\left. \begin{array}{l} a_i = a_{i-1} \\ b_i = b_{i-1} + a_{i-1} \end{array} \right\} \text{if } s_i = 1$$

Where $S_i$ is the $i^{th}$ element in the binary string S, the function BSCA(S) returns the Binary Pair:

BSCA($S_n$)=($a_n$, $b_n$)

Where GCD($a_n$, $b_n$)=1

The following example illustrates the BSCA function step by step. To find the Binary Pair (A,B) for the binary string (10010001), use:

BSCA(10010001)=(a,b)=(26,33)

Therefore, gcd(26,33)=1

Table 1 illustrates a step-by-step operation of BSCA( )

TABLE 1

| Calculating the Binary Pair (A, B) by BSCA function | | | | | | | | |
|---|---|---|---|---|---|---|---|---|
| Round | 1 | 2 | 3 | 4 | 5 | 6 | 7 | 8 |
| $S_i$ | 1 | 0 | 0 | 1 | 0 | 0 | 0 | 1 |
| $A_0 = 1$ | 1 | 3 | 5 | 5 | 12 | 19 | 26 | 26 |
| $B_0 = 1$ | 2 | 2 | 2 | 7 | 7 | 7 | 7 | 33 |

A proof of the Binary Sequence Cumulative Algorithm (BSCA) by mathematical induction is given below. Let the property P(n) where $n \geq 1$ be the function that generates all binary combinations of $2^n$, then for each binary combination, its Binary Pair is computed which satisfies the definition of BSCA($S_n$), given above.

$$gcd(a_1,b_1)=gcd(a_2,b_2)=gcd(a_3,b_3) \ldots =gcd(a_n,b_n)=1 \rightarrow E(1)$$

It can be shown that for all binary combinations with length $n \geq 1$, if P(n) is true, then P(n+1) is true:
Let n be an integer with $n \geq 1$, and $$gcd(a_1,b_1)=gcd(a_2,b_2)=gcd(a_3,b_3) \ldots =gcd(a_n,b_n)=1 \leftarrow P(n) \text{ (Indicative Hypothesis)}$$

It can shown that:

$$gcd(a_1,b_1)=gcd(a_2,b_2)=gcd(a_3,b_3) \ldots =gcd(a_{n+1},b_{n+1})=1 \leftarrow P(n+1)$$

The following example shows that P(n) is true in a Base Case. To prove the property for n=1, it is shown that $S_n$ satisfy E(1):
Since $S_1=\{0,1\}$, there are two cases:

$$bsca(0)=(2,1) \rightarrow E(2)$$

$$bsca(1)=(1,2) \rightarrow E(3)$$

From E(2), E(3), it was proven that P(n) is true since:

$$gcd(a_n,b_n)=gcd(2,1)=gcd(1,2)=1$$

It can be shown that P(n+1) is true in an inductive step. To prove the property for n+1, , it is shown that $S_{n+1}$ satisfy E(1). For $S_{n+1}$, prove the two cases:
Case(1): If the next bit is 0.
Case(2): If the next bit is 1.
Two lemmas can be used to prove the two cases.
Case(1): If the next bit is 0:
The function bsca($S_{n+1}$) returns ($A_{n+1}, B_{n+}$) as follow:

$$a_{n+1}=a_n+b_n$$

$$b_{n+1}=b_n$$

So, $$bsca(s_{n+1})=(a_{n+1},b_{n+1})=(a_n+b_n,b_n)$$

Lemma 1. The gcd function has the additive property:

$$gcd(a+b,b)=gcd(a,b)$$

Proof From a fundamental property in number theory, an integer d is a common divisor of a and b if d|a and d|b, then d|gcd(a,b).
First, prove that gcd(a,b) divides gcd(a+b,b). Define d =gcd(a,b). Since d|a and d|b, it can be written a=dα and b=dβ. Then a+b=d(α+β), so d|a+b. It follows that d|gcd (a+b,b).
Prove that gcd(a+b,b) divides gcd(a,b). This is implied by the first part. Define d'=gcd(a+b,b). If d'|(a+b), then a+b=$k_1$d' for integer $k_1$; also if d'|a, then a=$k_2$d' for integer $k_2$. Therefore b=(a+b)−a=$k_1$d'−$k_2$d'=($k_1$−$k_2$)d', showing that b is a multiple of d', so d'|b. Also, d'51 gcd(a,b)=d. Since d'|d and (as shown previously) d|d', d=d'
Case(2): If the next bit is 1:
The function bsca($S_{n+1}$) returns ($A_{n+1}, B_{n+1}$) as follows:

$$a_{n+1}=a_n$$

$$b_{n+1}=b_n+a_n$$

therefore, $$bsca(s_{n+1})=(a_{n+1},b_{n+1})=(a_n,b_n+a_n)$$

Lemma 2. The gcd function has the additive property:

$$gcd(a,b+a)=gcd(a,b)$$

Proof From a fundamental property in number theory, an integer d is a common divisor of a and b if d|a and d|b, then d|gcd(a,b).
Prove that gcd(a,b) divides gcd(a,b+a). Define d=gcd(a,b). Since d|a and d|b, it can be shown a=dα and b=dβ. Then b+a=d(β+α), so d|b+a. It follows that d|gcd(a,b+a).
Prove that gcd(a,b+a) divides gcd(a,b). This is implied by the first part. Define d'=gcd(a,b+a). If d'|(b+a), then b+a=$k_1$d' for integer $k_1$; also if d'|a, then a=$k_2$d ' for integer $k_2$. Then b=(b+a)−a=$k_1$d'−$k_2$d'=($k_1$−$k_2$)d', showing that b is a multiple of d', so d'|b. Therefore, d'|gcd(a,b)=d. Since d'|d and (as shown previously) d|d', d=d'
Since both the base case and the inductive step have been proven, it can be concluded that the Binary Pair (A,B), as defined above has a property: gcd(a,b)=1 for any binary combination S with length n, where n>1.
A proof of the Binary Sequence Cumulative Algorithm (BSCA) by Euclidean Algorithm is given below. Let us suppose that an arbitrary binary string starts with a bit 0 and ends with 1. Based on the definition given above, $a_n$ is greater than $b_n$. By using Euclidean Algorithm, the first step is to divide $a_n$ by $b_n$, hence represent $a_n$ in the form:

$$a_n=q_1 b_n+r_1$$

The formal description of Euclidean Algorithm states that the quotient q does not mean more than the result of division. Yet, in BSCA the quotient q represents the total runs of either zeros or ones. For each step of the algorithm, if $a_i > b_i$, then $q_i$ represents the runs of zeros. If $b_i > a_i$, then $q_i$ represents the runs of ones. As a result, the remainder $r_i$ means the value of either $a_i$ or $b_i$ after $q_i$ runs. Based on the finding, the first step of the algorithm should be in the form:

$$a_n=q_1 b_{n-q1}+a_{n-q1}$$

This process is continued until the remainder matches one of the initial values ($a_0$, $b_0$), which gives the following sequence of steps:

$$a_n = q_1 b_{n-q_1} + a_{n-q_1}$$

$$b_{n-q_1} = q_2 a_{n-q_1-q_2} + b_{n-q_1-q_2}$$

$$a_{n-q_1-q_2} = q_3 b_{n-q_1 \ldots -q_3} + q_{n-q_1 \ldots -q_3}$$

$$b_{n-q_1 \ldots -q_3} = q_4 a_{b-q_1 \ldots -q_4} + b_{n-q_1 \ldots -q_4}$$

$$\ldots$$

$$\ldots$$

$$\ldots$$

$$a_{n-q_1 \ldots -q_{k-2}} = q_{k-1} b_{n-q_1 \ldots -q_{k-1}} + a_{n-q_1 \ldots -q_{k-1}}$$

$$b_{n-q_1 \ldots -q_{k-1}} = q_k a_{n-q_1 \ldots -q_k} + b_{n-q_1 \ldots -q_k}$$

$$a_{n-q_1 \ldots -q_k} = b_{n-q_1 \ldots -q_k} + 0$$

The last step ends up with the initial values, $a_0$ and $b_0$, where:

$$a_{n-q_1 \ldots -q_k}=a_0=1$$

$$b_{n-q_1 \ldots -q_k}=b_0=1$$

Using the example described previously with reference to Table 1, BSCA function returns the following output values for the input sequence (10010001):

$$BSCA(10010001)=(33,26)$$

Testing the output values by the Euclidean Algorithm, gives the following results:

$$33=1*26+7$$

$$26=3*7+5$$

$$7=1*5+2$$

$$5=2*2+1$$

$$2=1*1+1$$

$$B_0=A_0+0$$

From the example above, it is clear that the quotient q values represent the runs for zeros and ones.

TABLE 2

The relation between the quotient q and the bits and runs

| Runs | 1 | | 2 | 1 | | 3 | | 1 |
|------|---|---|---|---|---|---|---|---|
| Bits | 1 | 0 | 0 | 1 | 0 | 0 | 0 | 1 |

From the above illustration and example, it was proven that gcd(a,b)=1 for any binary string with length n. In addition, it was proven that the quotient q represents the total number of binary runs by using the Euclidean Algorithm.

A practical proof using software code is given below. The Java code (Generator.java) proves that gcd(a,b)=1 is true for any binary combination. The software includes a method GenerateCombinationBin(exp) which generates all the binary combinations for $2^{exp}$. For each binary combination, it computes the Binary Pair and tests their gcd(a, b) and stores the output to a text file with the name: (output_binary_combination_of_2^<exp>.txt). The code also includes another method GenerateRandomeBin(l,n) which generates a random binary string of length (l) for (n) times. Then, it computes the Binary Pair (a,b) for the random binary string and tests gcd(a, b) and stores the output to a text file with the name: (output_randome_bits_of_length_<l>_for_<n>_times.txt).

The generated Binary Pair (A, B) by BSCA function ensures integrity to the original binary string. The Binary Pair is unique for any binary combination as previously defined; therefore, it is known when even a single bit in the binary string has been added, changed, or deleted. The Binary Pair also has the following properties:

$a \neq b$ $a, b > 0$ $gcd(a,b)=1.$

There exists d such that $bd \equiv bb^{-1} \equiv 1 \mod a$ min value of a,b=1 max value of a, b is computed by Binet's Formula, where n was previously defined $$F(n) = \frac{(1+\sqrt{5})^{n+2} - (1-\sqrt{5})^{n+2}}{2^{n+2}\sqrt{5}}$$

Binet's Formula is slightly changed by increasing N by 2 to meet the Binary Pair property of computing the max value. If N is to be in the range $1 \geq N \geq 2$, it results in 1 as the output, which causes the max value to be equal to the min value. To overcome this exponent problem in Binet's Formula, we add 2 to the input N, which was previously defined as $N \geq 1$. The exponent index always starts from 3, which satisfies the property of computing the max value, since the max value is always in the range $2 \geq m \geq \infty$.

Binet's Formula was previously proposed as a function to compute the Binary Pair max value of a given binary string of length N. Binet's Formula shows accurate outputs for limited inputs of N. However, Binet's Formula losses accuracy when the inputs of N are very large, depending on who designed the function. In the BSCA function, the max value of a binary string can be computed by the binary consecutive sequence in the form {01} or {10}. The greatest value of the final Binary Pair values is taken as the max value. For example, the max value of a binary string with 8 bits in length, along with the binary consecutive sequence in the form {10} is computed. The following table illustrates the calculation.

TABLE 3

Calculating the max value for the Binary Pair (A, B)

| N = 8     | 1 | 2 | 3 | 4 | 5 | 6  | 7  | 8  |
|-----------|---|---|---|---|---|----|----|----|
| Bits      | 1 | 0 | 1 | 0 | 1 | 0  | 1  | 0  |
| $A_0 = 1$ | 1 | 3 | 3 | 8 | 8 | 21 | 21 | 55 |
| $B_0 = 1$ | 1 | 2 | 2 | 5 | 5 | 13 | 13 | 34 |

Since the final run shows 55 is the greatest, the max value of a binary string with 8 bits in length is 55. Using Binet's Formula:

$$F(8) = \frac{(1+\sqrt{5})^{8+2} - (1-\sqrt{5})^{8+2}}{2^{8+2}\sqrt{5}} = 55$$

A relation can be drawn between the BSCA function and Fibonacci Numbers when it comes to computing the max value. Computing the Binary Pair using the pattern of consecutive sequence of {01} or {10} will result in calculating the Fibonacci numbers Fn+2 and Fn+1. From Table 3, the last round shows that the following relation between the Binary Pair (A,B) and the consecutive Fibonacci numbers can be in the form:

$A_n = F_{n+2}$ $B_n = F_{n+1}$

With reference to the last round in Table 3, we can substitute n to test the outputs, which results in:

$A_8 = F_{8+2} = 55$ $B_8 = F_{8+1} = 34$

Figure 2A:
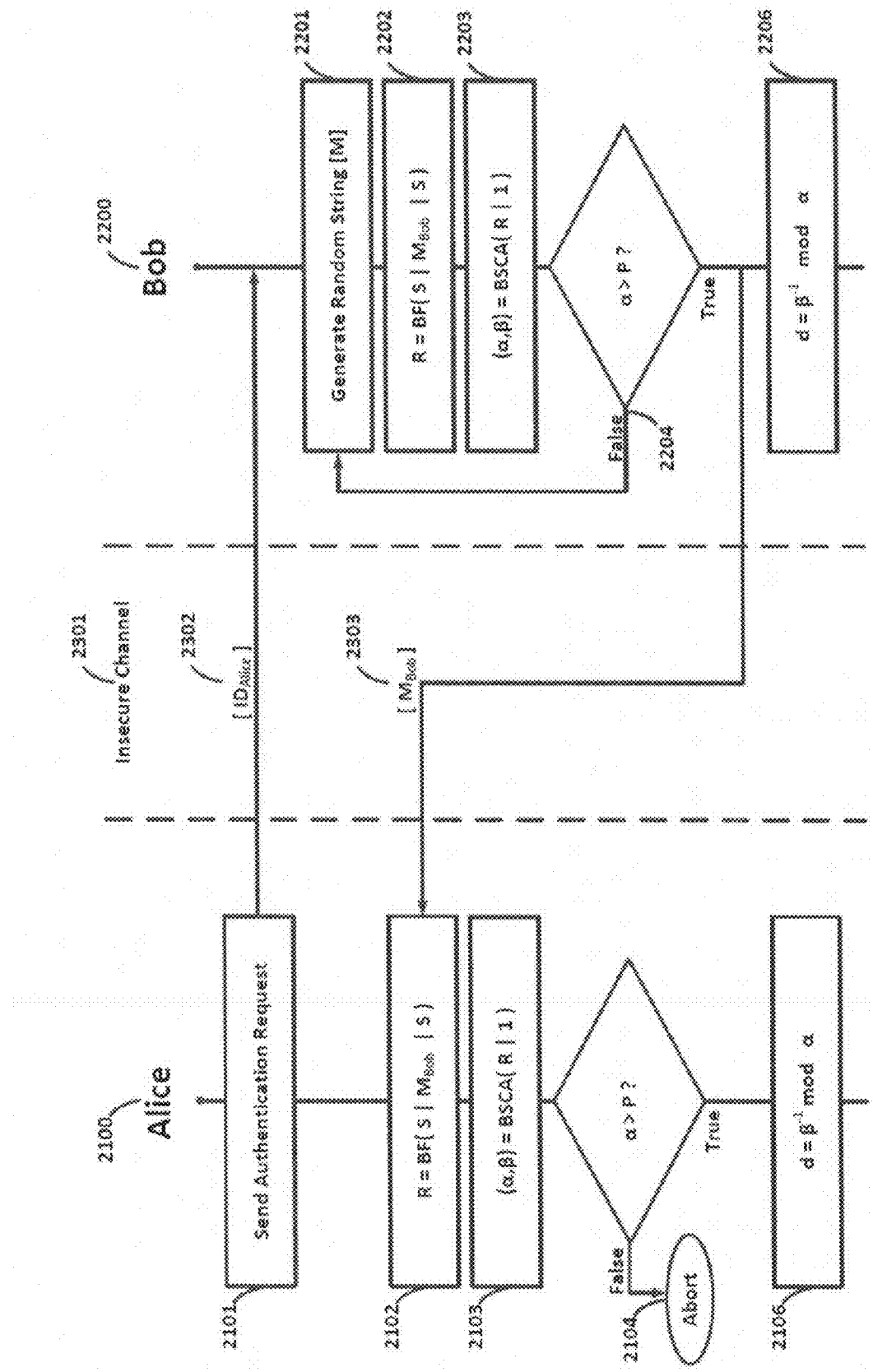
FIGS. 2A-2C are flowcharts of an operation between two end-point systems, where both parties memorize and protect a shared secret, according to one example.
Figure 2B:
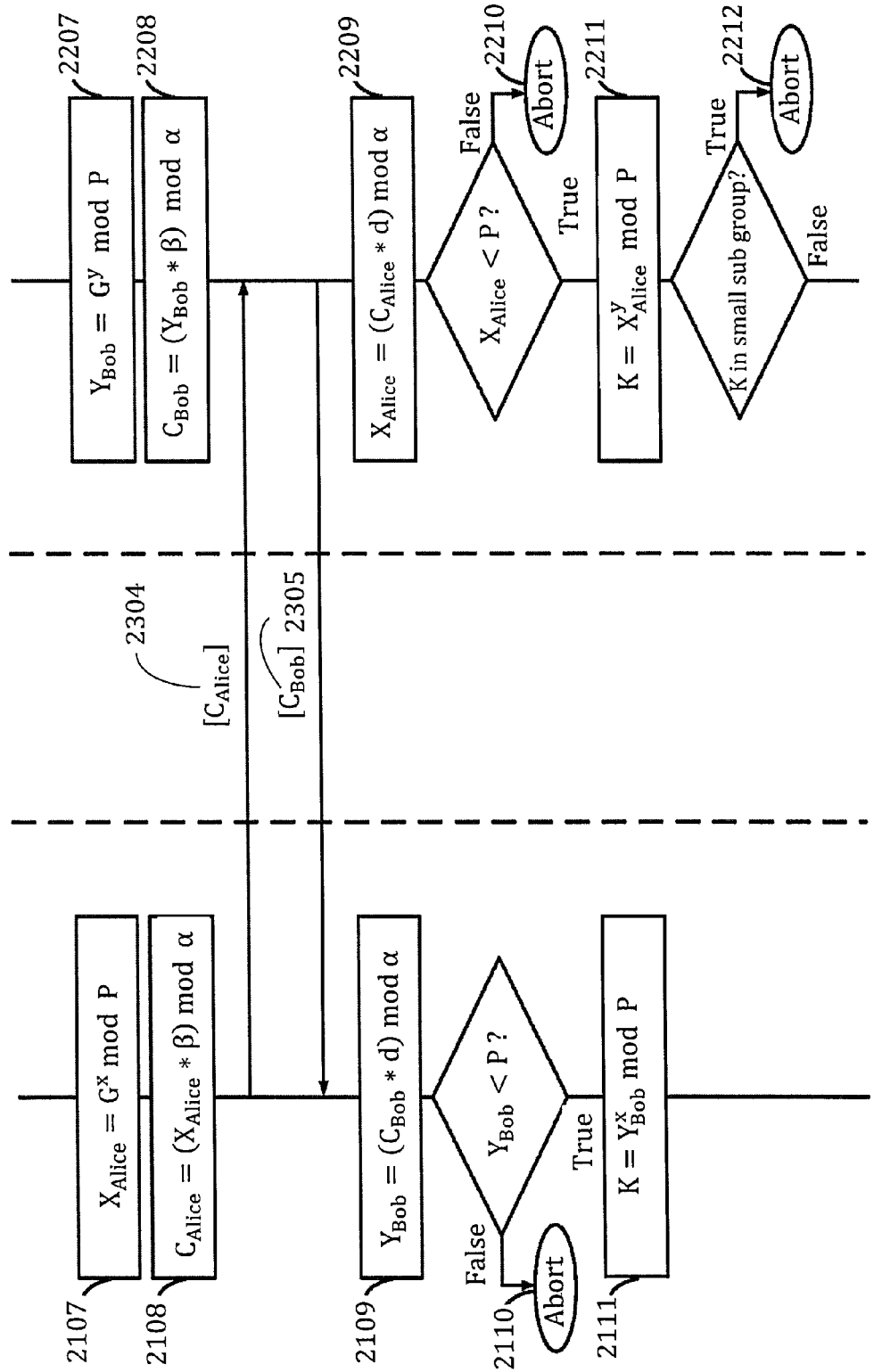

An example of symmetric-key cryptography is given below to illustrate a cryptographic method for secure end-to-end communication. In this method, Alice and Bob share knowledge of a secret S. Both parties prove knowledge of the shared secret by proving their success in encrypted DH key exchange. Alice and Bob protect access to S from untrusted parties by hardcoding, for instance. FIGS. 2A-2B represent Alice 2100 and Bob 2200, who are two parties sharing a secret S, and wish to authenticate each other over insecure channel 2301 (e.g. Internet) and establish secure communication. The following steps are illustrated in FIGS. 2A-2C.

Phase1: Compute Dynamic Binary Pair ($\alpha$, $\beta$):
Alice sends an authentication request 2101 along with her ID 2302 (e.g. user name) to Bob.
In order to authenticate Alice, Bob performs the following steps:
2201 randomly generates a string $M_{Bob}$ of length L
2202 concatenates the shared secret S one time as a prefix and one time as a suffix with $M_{Bob}$ to generate R through the function BF().
2203 send R padded to the right with 1 as input to the function BSCA() to compute the dynamic Binary Pair ($\alpha$,$\beta$). The purpose of right-padding R with 1 is to get the function BSCA() to always return $\beta$>$\alpha$.
2204 return to 2201 if $\alpha$<P.
2303 send $M_{Bob}$ to Alice.
2206 compute d as the multiplicative inverse of ($\beta$ mod $\alpha$).
Alice performs the following steps:
2102 concatenate the shared secret S one time as a prefix and one time as a suffix with $M_{Bob}$ to generate R through the function BF().
2103 send R padded to the right with 1 as the input to the function BSCA() to compute the dynamic Binary Pair ($\alpha$,$\beta$). The purpose of right-padding R with 1 is to get the function BSCA() to always return $\beta$>$\alpha$.
2104 abort if $\alpha$<P.
2106 compute d as the multiplicative inverse of ($\beta$ mod $\alpha$)
By the end of this phase, both Alice and Bob must have identical dynamic values for the Binary Pair ($\alpha$, $\beta$) and the multiplicative inverse d because those values were derived from the long-term key S and the short-term random message $M_{Bob}$ which are both known to the communication parties at this point.
Phase2: Challenge Exchange
Since Alice and Bob have identical session values ($\alpha$, $\beta$, d) from the previous phase, mutual authentication can be achieved when both parties challenge each other's knowledge of these values, because they are derived from the random message $M_{Bob}$ and the shared secret S, which is only known by Alice and Bob. To challenge Bob's knowledge of the session values ($\alpha$, $\beta$, d), Alice performs the following steps in sequence, with continued reference to FIGS. 2A-2C.
2107 choose a random exponent x, $2 \leq x \leq p-1$, and compute a ephemeral DH public key: $X_{Alice} = G^x$ mod P.
2108 encrypt the ephemeral DH public key: $C_{Alice} = (X_{Alice} * \beta)$ mod $\alpha$.
2304 publicly send $Q_{Alice}$ to Bob.
Independently, Bob performs the following steps to challenge Alice's knowledge of the session values ($\alpha$, $\beta$, d):
2207 choose a random exponent y, $2 \leq y \leq p-1$, and compute a ephemeral DH public key: $Y_{Bob} = G^Y$ mod P.
2208 encrypt the ephemeral DH public key: $C_{Bob} = (Y_{Bob} * \beta)$ mod $\alpha$.
2305 publicly send $C_{Bob}$ to Alice.
By the end of this phase, encrypted DH public keys will be exchanged between Alice and Bob. The challenge is whether both parties will be able to decrypt these keys successfully or not.
Phase3: Challenge Response Exchange
Up to this point, Alice and Bob have exchanged encrypted DH public keys ($C_{Alice}$, $C_{Bob}$). Now, the two parties can decrypt the DH public keys if and only if they have identical session values ($\alpha$, $\beta$, d). Once they successfully decrypt ephemeral DH public keys, they can compute a key and verify it, using a one-way hash function. The verification here is sent as a challenge response to the other party to prove knowledge of the secret S.

Figure 2C:
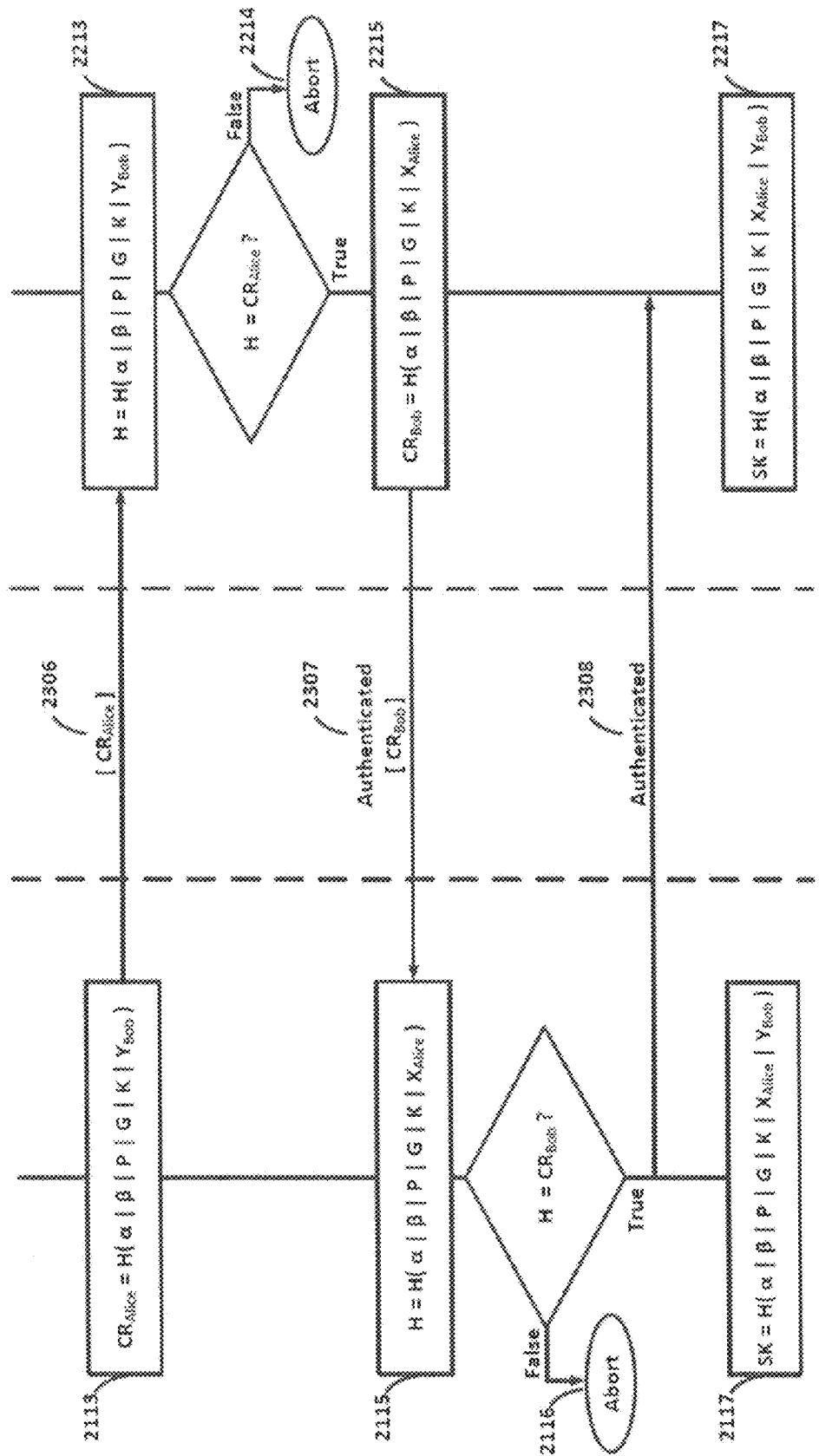

With continued reference to FIGS. 2A-2C, Alice performs the following steps to generate the challenge response.
2109 decrypt Bob's ephemeral DH public key: $Y_{Bob} = (C_{Bob} * d)$ mod $\alpha$.
2110 abort if not $Y_{Bob}$<P.
2111 compute the verification key: $K = (Y_{Bob})^x$ mod P.
2113 compute the challenge response: $CR_{Alice} = H(\alpha|\beta|P|G|K|Y_{Bob})$.
2306 send $CR_{Alice}$ to Bob.
Independently, Bob performs the following steps to verify Alice's challenge response.
2209 decrypt Alice's ephemeral DH public key: $X_{Alice} = (C_{Alice} * d)$ mod $\alpha$.
2210 abort if not $X_{Alice}$<P.
2211 compute the verification key: $K = (X_{Alice})^y$ mod P.
2212 abort if K is in a small group.
2213 compute Alice's expected challenge response:

$$H = H(\alpha|\beta|P|G|K|Y_{Bob}).$$

2214 abort if H does not match $CR_{Alice}$.
Both parties will arrive at the same value for the verification key K only if they successfully decrypt ephemeral DH public keys ($C_{Alice}$, $C_{Bob}$), since failing to decrypt one of these keys will create different results for K. Since Bob plays the authenticator role, he verifies Alice's challenge response $CR_{Alice}$ before he sends his challenge response to Alice. If Bob successfully verifies Alice's challenge response $CR_{Alice}$, he proceeds to generate his challenge response in the following steps, with continued reference to FIGS. 2A-2C.
2215 compute the challenge response: $CR_{Bob} = H(\alpha|\beta|P|G|K|X_{Alice})$
2307 send $CR_{Bob}$ to Alice along with "Authenticated" message when she successfully proves her knowledge of S.
Alice now verifies Bob's challenge response $CR_{Bob}$ in the following steps.
2115 compute Bob's expected challenge response:

$$H = H(\alpha|\beta|P|G|K|X_{Alice})$$

2116 abort if H does not match $CR_{Bob}$.
2308 send Bob an "Authenticated" message when he successfully proves his knowledge of S.
After a series of exchanged messages, Alice and Bob can mutually authenticate each other, and they can now agree on a shared session key SK for secure communication. Alice computes the shared session key SK, as follows.
2117 compute the session key:

$$SK = H(\alpha|\beta|P|G|K|X_{Alice}|Y_{Bob})$$

Bob will do the same calculation to compute the shared session key SK, as follows.
2217 compute the session key:

$$SK = H(\alpha|\beta|P|G|K|X_{Alice}|Y_{Bob})$$

Both parties will compute the same session key SK if all previous steps are executed correctly. Guessing the shared secret S in 2104 or 2204 would result in authentication failure, since at least one of the short-term values ($\alpha$, $\beta$, K, X, Y) would be mismatched between the two parties. Also, it is very difficult for an eavesdropper to gain knowledge of the session key SK or the shared secret S, just by capturing the publicly exchanged messages (M, $C_{Alice}$, $C_{Bob}$, $CR_{Alice}$, $CR_{Bob}$) because the short-term verification key K is independent from the long-term shared secret S.
An example of public-key cryptography based on zero-knowledge proofs is given below to illustrate a secure authentication method for multi-user systems. In this method, only Alice shares knowledge of a secret S, while Bob verifies Alice's knowledge of the secret. Alice proves her knowledge of the secret to the verifier Bob by proving her success in encrypted DH key exchange. Alice memorizes S while Bob stores a verifier for Alice $V_{Alice}$ in a database file.

Since Bob plays the authenticator role (e.g. server), he accepts a verifier from Alice (e.g. client) in advance. This setup is performed by Alice and Bob every time Alice creates or changes the secret S. Accordingly, the following steps can be implemented.

Alice chooses her secret $S_{Alice}$ and random salt $Salt_{Alice}$.
Alice calculates her verification:

$$v = H(S_{Alice} | Salt_{Alice})$$

$$V_{Alice} = G^v \bmod P$$

Alice sends $V_{Alice}$ and the $Salt_{Alice}$ to Bob.
Bob stores $ID_{Alice}$, $V_{Alice}$, $Salt_{Alice}$ in a database file for future communication.

Figure 3A:
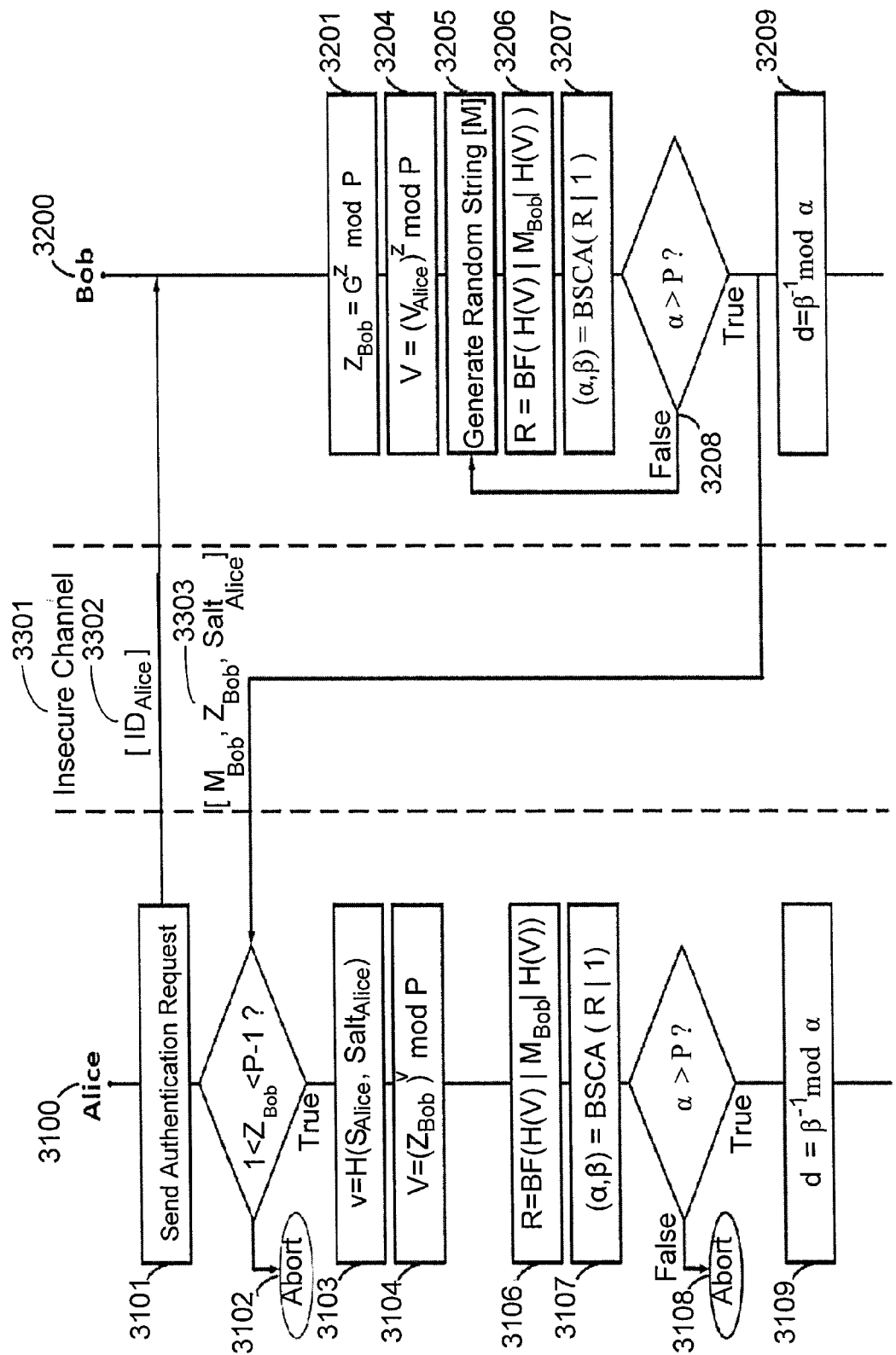
FIGS. 3A-3C are flowcharts of an operation between a user and a server based on zero-knowledge proofs, where the user memorizes the secret and the server stores a verifier to test the user's knowledge of the secret, according to one example.
Figure 3B:
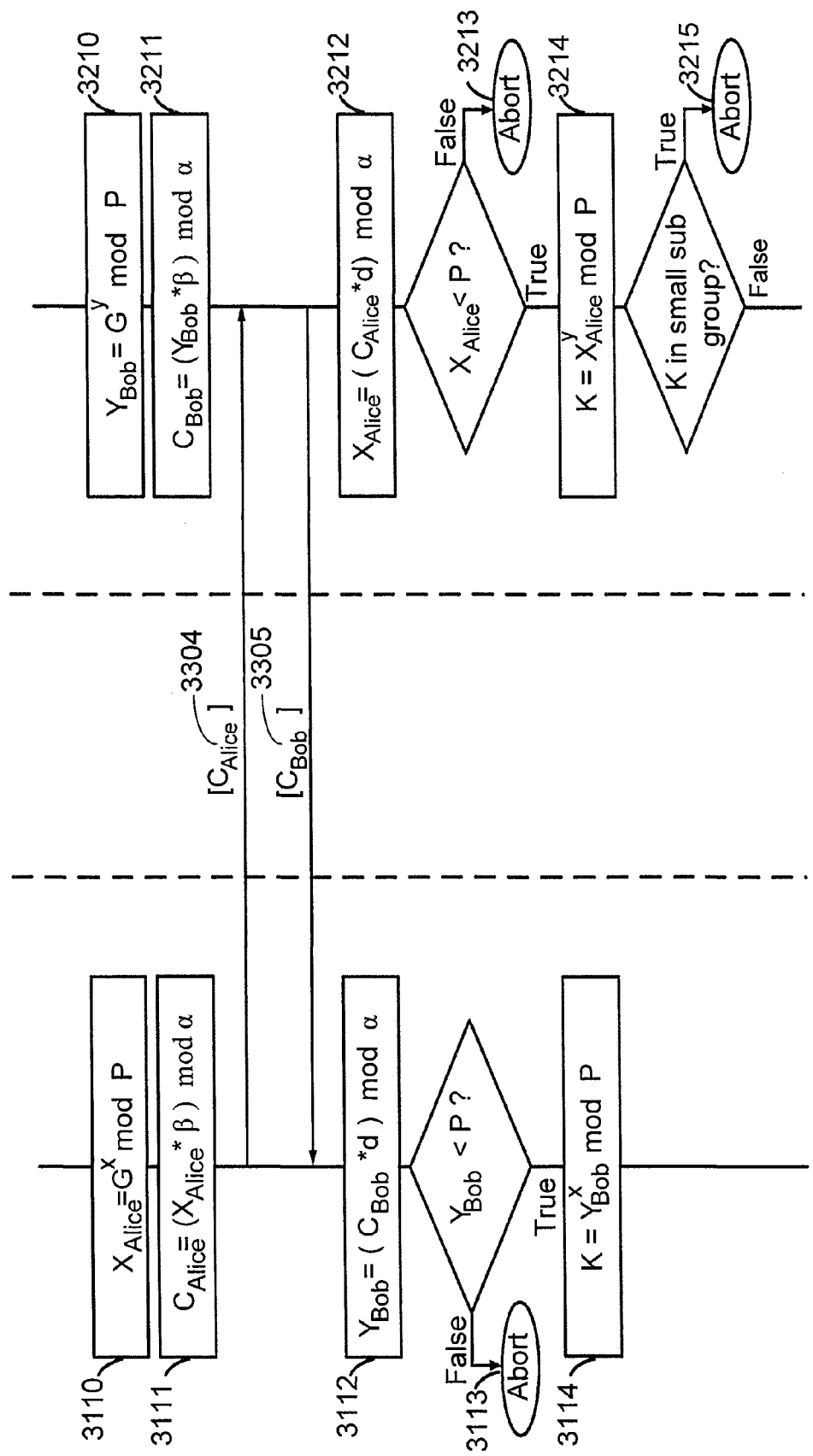
Figure 3C:
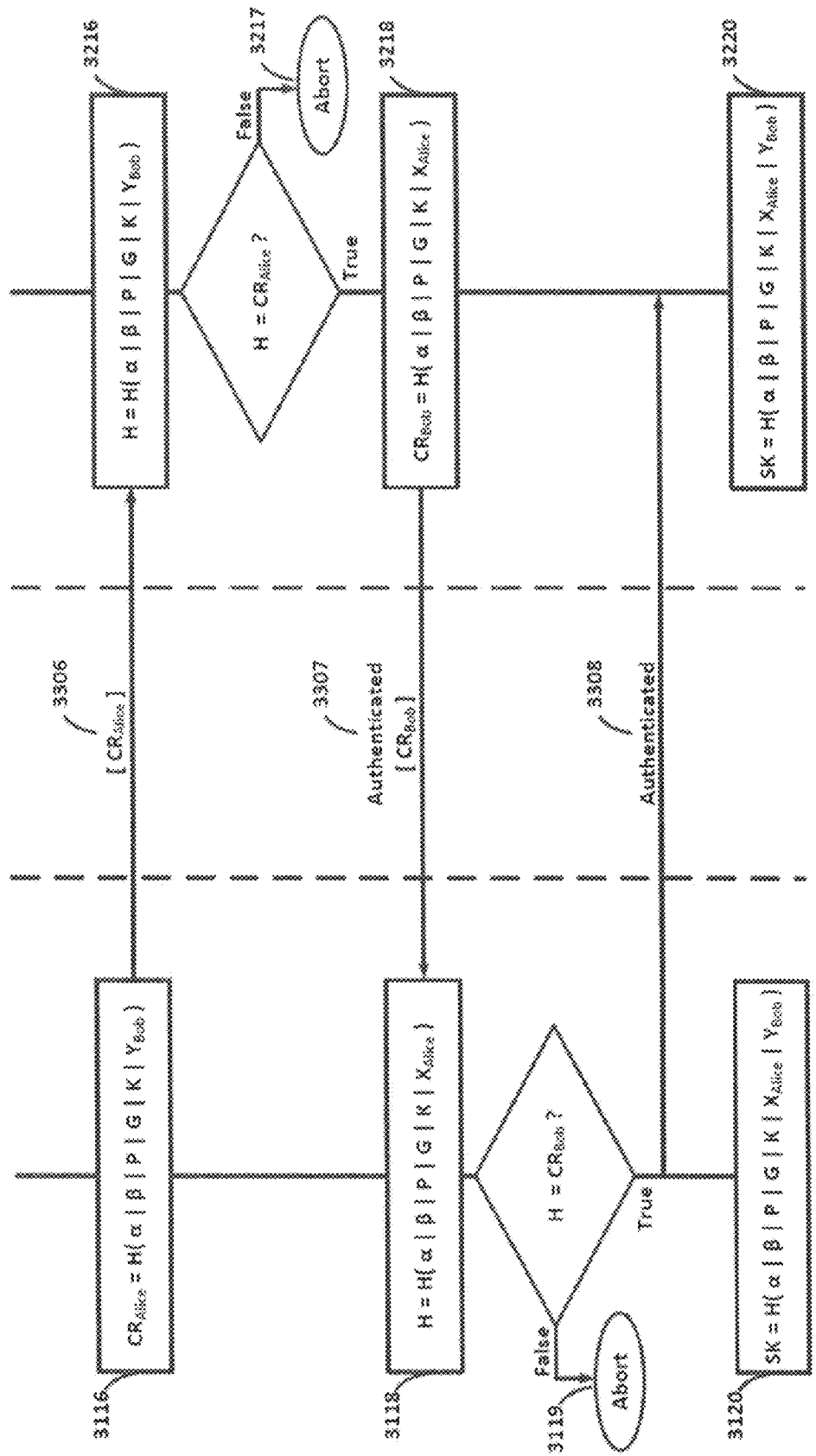

After all of the prior setup has been completed as described above, the secure authentication method between Alice and Bob proceeds as follows. Referring to FIGS. 3A-3C, Alice 3100 and Bob 3200 are two parties that wish to authenticate each other over an insecure channel 3301 (e.g. Internet).

Phase1: Computing Dynamic Binary Pair (α, β)

Alice sends an authentication request 3101 along with her ID 3302 (e.g. user name) to Bob. Bob gets Alice's verifier and salt ($V_{Alice}$, $Salt_{Alice}$) from the database file and generates a public DH key in order to verify Alice's knowledge of the secret S. The following steps are performed.

3201 Bob chooses a random exponent z in the range [2, P−1] and computes:

$$Z_{Bob} = G^z \bmod P$$

3204 Bob computes the following, using Alice's verifier:

$$V = V_{Alice}^z \bmod P$$

3205 randomly generate a string $M_{Bob}$ of length L.
3206 send the concatenation of H(V) as a prefix and a suffix with $M_{Bob}$ to generate R through BF( ) function.
3207 send R padded to the right with 1 as an input to the function BSCA( ) to compute the dynamic Binary Pair (α,β). The purpose of right-padding R with 1 is to get the function BSCA( ) to always return β>α.
3208 return to 3204 if α<p
3303 publicly send $M_{Bob}$, $Z_{Bob}$, $Salt_{Alice}$ to Alice.
3209 compute d as the multiplicative inverse of (β mod α).

Alice performs the following steps to prove her knowledge of the secret S, with continued reference to FIGS. 3A-3C.

3102 Alice validates the public key $Z_{Bob}$ and aborts if it is invalid.
3103 Alice computes the exponent v as a function of the secret and the salt:

$$v = H(S_{Alice} | Salt_{Alice})$$

3104 Alice computes the following, using Bob's ephemeral public key:

$$V = Z_{Bob}^v \bmod P$$

3106 send the concatenation of H(V) as a prefix and a suffix with $M_{Bob}$ to BF( ) function to generate R.
3107 send R padded to the right with 1 as an input to the function BSCA( ) to compute the dynamic Binary Pair (α,β).

The purpose of right-padding R with 1 is to get the function BSCA( ) to always return β>α.
3108 abort if α<p.
3109 compute d as the multiplicative inverse of (β mod α).

Since Alice only knows the secret $S_{Alice}$ and Bob knows the secret verifier for Alice $V_{Alice}$ the values for V in the steps 3104 and 3204 are matched in order to proceed to the second phase. By the end of this phase, both Alice and Bob have identical dynamic values for the Binary Pair (α, β) and the multiplicative inverse d because those short-term values are derived from $M_{Bob}$ and V, which is only known to the communication parties at this point.

Phase2: Challenge Exchange

Since Alice and Bob have identical session values (α, β, d) from the previous phase, mutual authentication can be achieved when both parties challenge each other's knowledge of these values. They are derived from the random message $M_{Bob}$ and the long-term secret $S_{Alice}$ which is only known by Alice, and the long-term verifier $V_{Alice}$ which is only known by Bob.

To challenge Bob's knowledge of the session values (α, β, d), Alice performs the following steps, with continued reference to FIGS. 3A-3C.

3110 choose a random exponent x, 2≤x≤p−1, and compute a ephemeral DH public key: $X_{Alice} = G^x \bmod P$.
3111 encrypt the ephemeral DH public key: $C_{Alice} = (X_{Alice} * \beta) \bmod \alpha$.
3304 publicly send $C_{Alice}$ to Bob.

To challenge Alice's knowledge of the session values (α, β, d) independently, Bob performs the following steps.

3210 choose a random exponent y, 2≤y≤p−1, and compute ephemeral DH public key: $Y_{Bob} = G^y \bmod P$.
3211 encrypt the ephemeral DH public key: $C_{Bob} = (Y_{Bob} * \beta) \bmod \alpha$.
3305 publicly send $C_{Bob}$ to Alice.

By the end of this phase, encrypted DH public keys will be exchanged between Alice and Bob. The challenge is whether both parties will be able to decrypt these keys successfully or not.

Phase3: Challenge Response Exchange

Alice and Bob have exchanged encrypted DH public keys ($C_{Alice}$, $C_{Bob}$). The two parties can now decrypt the DH public keys if and only if they have identical session values (α, β, d). Once they successfully decrypt ephemeral DH public keys, they can compute a key and verify it using a one-way hash function. The verification is sent as a challenge response to the other party to prove knowledge of the secret S. Alice performs the following steps to generate the challenge response, with continued reference to FIGS. 3A-3C.

3112 decrypt Bob's ephemeral DH public key: $Y_{Bob} = (C_{Bob} * d) \bmod \alpha$.
3113 abort if not $Y_{Bob}$<P.
3114 compute the verification key: $K = (Y_{Bob})^x \bmod P$.
3115 compute the challenge response: $CR_{Alice} = H(\alpha|\beta|P|G|K|Y_{Bob})$.
3306 send $CR_{Alice}$ to Bob.

In order to authenticate Alice independently, Bob performs the following steps to verify Alice's challenge response.

3212 decrypt Alice's ephemeral DH public key: $X_{Alice} = (C_{Alice} * d) \bmod \alpha$.
3213 abort if not $X_{Alice}$<P.
3214 compute the verification key: $K = (X_{Alice})^y \bmod P$.
3215 abort if K is in a small group.

3216 compute Alice's expected challenge response:

$$H = H(\alpha|\beta|P|G|K|Y_{Bob}).$$

3217 abort if H does not match $CR_{Alice}$.

Both parties will arrive at the same verification key value K only if they successfully decrypt ephemeral DH public keys ($C_{Alice}$, $C_{Bob}$), since failing to decrypt one of these keys will create different results for K. Since Bob plays the authenticator role, he verifies Alice's challenge response $CR_{Alice}$ before he sends his challenge response to Alice. If Bob successfully verifies Alice's challenge response $CR_{Alice}$, he proceeds to generate his challenge response in the following steps.

3218 compute challenge response: $CR_{Bob} = H(\alpha|\beta|P|G|K|X_{Alice})$.

3307 send $CR_{Bob}$ to Alice with "Authenticated" message when she successfully proves her knowledge of S.

Alice now verifies Bob's challenge response $CR_{Bob}$ in the following steps.

3118 compute Bob's expected challenge response:

$$H = H(\alpha|\beta|P|G|K|X_{Alice}).$$

3119 abort if H does not match $CR_{Bob}$.

3308 send Bob an "Authenticated" message when he successfully proves his knowledge of S.

After a series of exchanged messages, Alice and Bob mutually authenticate each other, and they can now agree on a shared session key SK for secure communication.

Alice computes the shared session key SK as follows, with continued reference to FIGS. 3A-3C.

3120 compute $SK = H(\alpha|\beta|P|G|K|X_{Alice}|Y_{Bob})$.

Bob will do the same calculation to compute the shared session key SK as follows.

3220 compute $SK = H(\alpha|\beta|P|G|K|X_{Alice}|Y_{Bob})$.

Both parties will compute the same session key SK if all previous steps are executed correctly. If Alice guesses the shared secret S in 3102, it would result in authentication failure since at least one of the session values ($\alpha$, $\beta$, K, X, Y) would be mismatched between the two parties. Also, it is very difficult for an eavesdropper to gain knowledge of the session key SK or the shared secret S just by capturing the publicly exchanged messages ($M_{Bob}$, $Z_{Bob}$, $Salt_{Alice}$, $C_{Alice}$, $C_{Bob}$, $CR_{Alice}$, $CR_{Bob}$) because the short-term verification key K is independent from the long-term secret $S_{plice}$ and the long-term verifier $V_{Alice}$.

The computer-implemented methods and algorithms described herein are implemented and executed on one or more computing systems. A hardware description of the computing system according to exemplary embodiments is described with reference to FIG. 4. The computing system includes a CPU 400 which performs the processes described above. The process data and instructions may be stored in memory 402. These processes and instructions may also be stored on a storage medium disk 404 such as a hard disk drive (HDD) or portable storage medium or may be stored remotely. Further, the claimed embodiments are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing system communicates, such as a server or computer.

Further, the claimed embodiments may be provided as a utility application, background daemon, or component of an operating system, or combination thereof, executing in conjunction with CPU 400 and an operating system such as Microsoft Windows 7, UNIX, Solaris, LINUX, Apple MAC-OS and other systems known to those skilled in the art.

CPU 400 may be a Xenon or Core processor from Intel of America or an Opteron processor from AMD of America, or may be other processor types that would be recognized by one of ordinary skill in the art. Alternatively, the CPU 400 may be implemented on an FPGA, ASIC, PLD or using discrete logic circuits, as one of ordinary skill in the art would recognize. Further, CPU 400 may be implemented as multiple processors cooperatively working in parallel to perform the instructions of the inventive processes described above.

Figure 4:
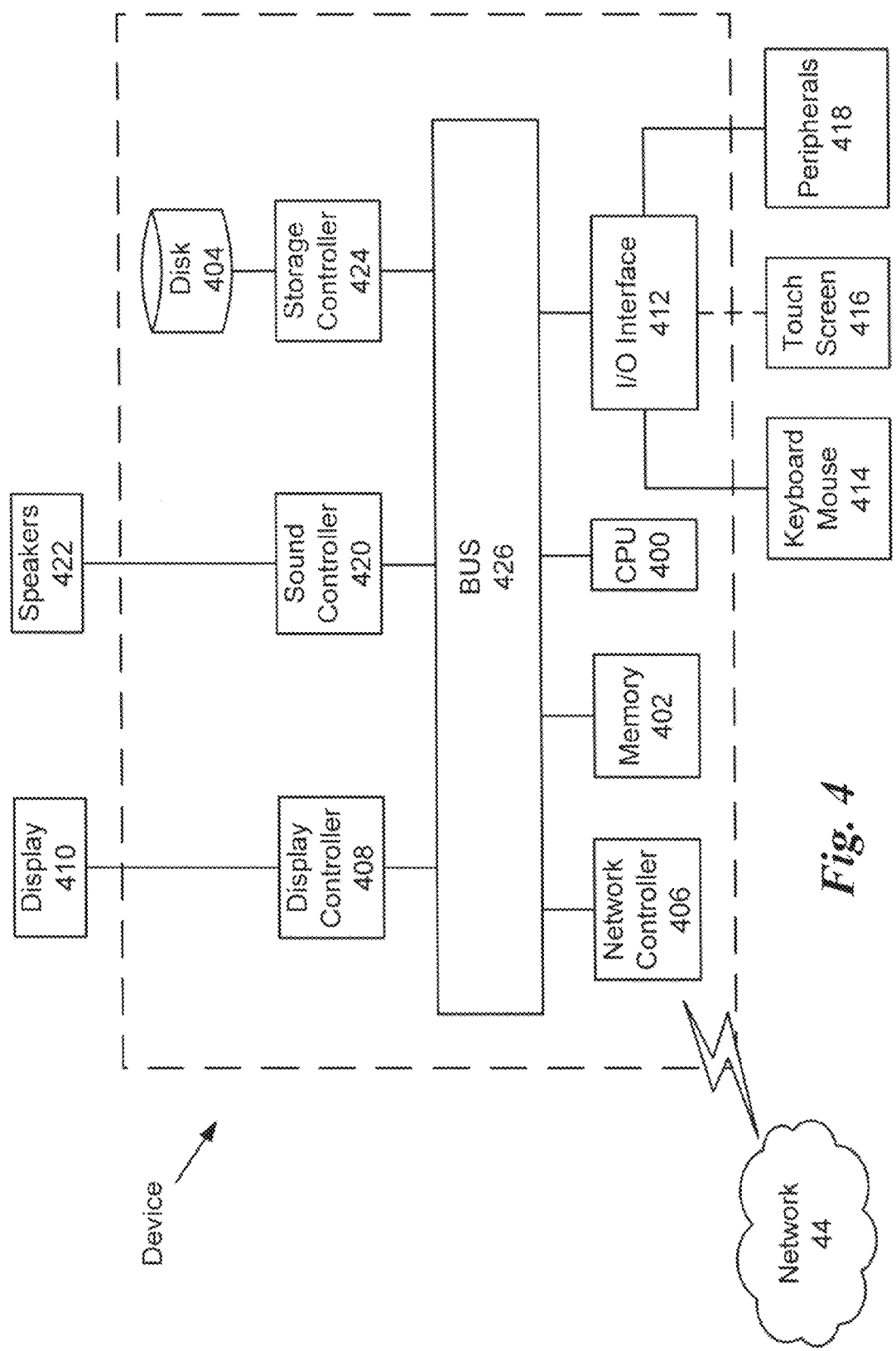
FIG. 4 illustrates a computing system according to exemplary embodiments.

The computing system in FIG. 4 also includes a network controller 406, such as an Intel Ethernet PRO network interface card from Intel Corporation of America, for interfacing with network 44. As can be appreciated, the network 44 can be a public network, such as the Internet, or a private network such as an LAN or WAN network, or any combination thereof and can also include PSTN or ISDN sub-networks. The network 44 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing system further includes a display controller 408, such as a NVIDIA GeForce GTX or Quadro graphics adaptor from NVIDIA Corporation of America for interfacing with display 410, such as a Hewlett Packard HPL2445w LCD monitor. A general purpose I/O interface 412 interfaces with a keyboard and/or mouse 414 as well as a touch screen panel 416 on or separate from display 410. General purpose I/O interface 412 also connects to a variety of peripherals 418 including printers and scanners, such as an OfficeJet or DeskJet from Hewlett Packard.

A sound controller 420 is also provided in the computing system, such as Sound Blaster X-Fi Titanium from Creative, to interface with speakers/microphone 422 thereby providing sounds and/or music.

The general purpose storage controller 424 connects the storage medium disk 404 with communication bus 426, which may be an ISA, EISA, VESA, PCI, or similar, for interconnecting all of the components of the computing system. A description of the general features and functionality of the display 410, keyboard and/or mouse 414, as well as the display controller 408, storage controller 424, network controller 406, sound controller 420, and general purpose I/O interface 412 is omitted herein for brevity as these features are known.

Figure 5:
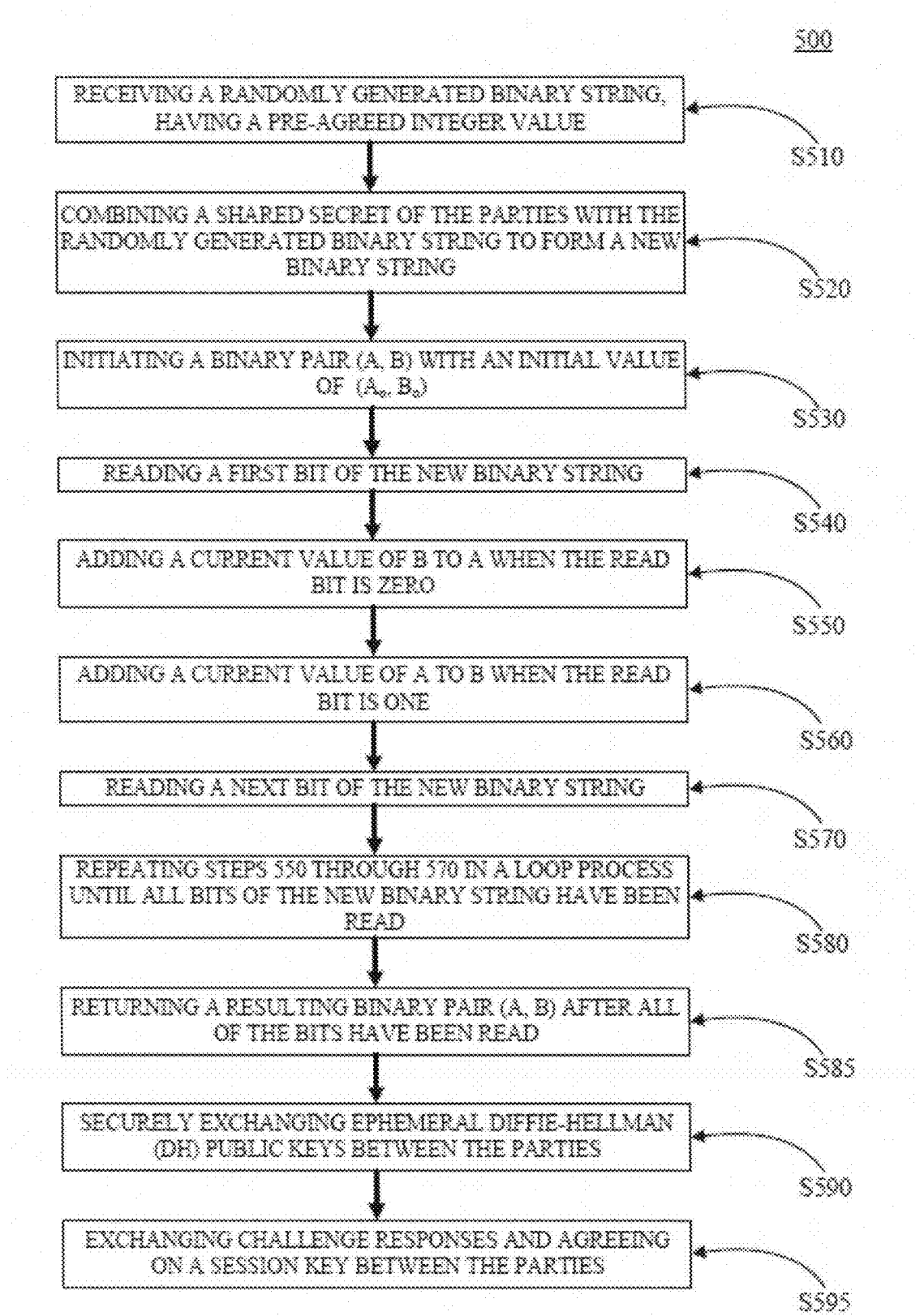
FIG. 5 is a flowchart that illustrates a computer-implemented method of authentication between parties, according to one example.

FIG. 5 is a flowchart that illustrates a computer-implemented method 500 of authentication between parties. A randomly generated binary string, having a pre-agreed integer value is received in step S510. A shared secret of the parties is combined with the randomly generated binary string to form a new binary string in step S520. A binary pair (A, B) with an initial value of ($A_0$, $B_0$) is initiated in step S530. A first bit of the new binary string is read in step S540. A current value of B is added to A when the read bit is zero in step S550. A current value of A is added to B when the read bit is one in step S560. A next bit of the new binary string is read in step S570. Steps S550-S570 are repeated in a loop process, via a processor of a computing device, until all bits of the new binary string have been read in step S580. A resulting binary pair (A, B) is returned after all of the bits have been read in step S585. Ephemeral Diffie-Hellman (DH) public keys are securely exchanged between the parties in step S590. Challenge responses are exchanged and a session key is agreed upon between the parties in step S595.

The methods and systems of the present disclosure offer a number of benefits for challenge-response authentication systems. The shared secret stored in the authentication database file is not sufficient by itself to impersonate the client; decryption is required. The agreed session key is known only to the mutually trusted parties. Compromised past session keys will not help the adversary to get the future session keys and to derive the secret (e.g. password). A compromised shared secret does not affect the secrecy of previous session keys. An adversary cannot perform the passive exhaustive search of the shared secret by using the eavesdropped messages of one or more sessions. An active adversary can guess only one possible secret per authentication attempt.

The present disclosure provides a solution for secret-key/public-key authentication methods and systems that seek a secure cryptographic method to mutually authenticate users and devices over a public channel, such as the Internet. It also solves security issues related to active and passive attacks against secret-based authentication systems.

The present disclosure provides an improvement upon the DH key exchange method, which does not provide authentication and is therefore subject to a man-in-the-middle attack. It performs authenticated DH key exchange, based on a shared secret without the need for a third party to authenticate the identity of the communication parties, such as a Key Distributed Center or a public key cryptosystem. It also does not require the use of a digital signature to sign or encrypt messages over a public channel. It is optimized to support one-way authentication.

The presently disclosed methods and algorithms are secure against active and passive attacks, since publicly exchanged messages reveal no information about the long-term shared secret and the short-term session key. In addition, the methods and algorithms described herein provide forward secrecy against future compromises. They accomplish both secrecy and identity authentication without the need for a key distribution center or public key cryptosystem.

The presently disclosed algorithm can be used for a key derivation function. It provides an approach to represent binary data in a decimal format other than $2^x$. It also provides error checking for a small amount of binary data, and it can generate infinite unique sub keys which are derived from one master key.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A computer-implemented method of authentication and establishment of a communication channel between client devices over a network, comprising:
   a) receiving, from a first client device, a randomly generated binary string;
   b) combining, by a second client device, a secret key associated with the first client device and the second client device with the randomly generated binary string to form a new binary string;
   c) initiating, by the second client device, a binary pair (A, B) with an initial value of $(A_0, B_0)$;
   d) reading, by the second client device, a bit of the new binary string;
   e) adding, by the second client device, a current value of B to A when the read bit is zero;
   f) adding, by the second client device, a current value of A to B when the read bit is one;
   g) reading, by the second client device, a next bit of the new binary string;
   repeating, via processing circuitry, steps e) through g) until all bits of the new binary string have been read;
   computing, by the second client device, a final binary pair (A, B) after all of the bits have been read;
   generating, by the second client device, a first ephemeral Diffie-Hellman (DH) public key as a function of the final binary pair (A, B);
   receiving, at the second client device from the first client device, a second ephemeral DH public key;
   decrypting, at the second client device, the second ephemeral DH public key as a function of the final binary pair (A, B);
   exchanging, between the first client device and the second client device, challenge responses based on decryption of the first and second ephemeral DH public keys;
   authenticating, between the first client device and the second client device, the challenge responses;
   agreeing, based on authentication of the challenge responses, on a session key for communication between the first client device and the second client device, wherein $A_i$ is a current value of A and is equal to $A_{i-1}$ when the read bit is equal to one; and
   establishing a secure communication channel over the network, between the first client device and the second client device, wherein information is communicated between the first client device and the second client device over the secure communication channel based on the agreed session key.

2. The computer-implemented method of claim 1, wherein the final binary pair (A, B) contains two unique prime integers.

3. The computer-implemented method of claim 1, wherein the final binary pair (A, B) has a modular multiplicative inverse.

4. The computer-implemented method of claim 1, wherein the binary string is variable.

5. The computer-implemented method of claim 4, wherein the final binary pair (A, B) varies upon adding, changing, or deleting one or more bits of the binary string.

6. The computer-implemented method of claim 1, wherein prior knowledge of the secret key by the first client device and the second client device is required for authentication.

7. The computer-implemented method of claim 1, wherein the computer-implemented method reveals no information about the secret key to other client devices.

8. The computer-implemented method of claim 7, wherein the computer-implemented method reveals no information about the session key to the other client devices.

9. A non-transitory computer-readable medium having computer-readable instructions thereon, that when executed by a computer, cause the computer to perform a method of authentication and establishment of a communication channel between client devices over a network, the method comprising:

a) receiving, from a first client device, a randomly generated binary string;
b) combining, by a second client device, a secret key associated with the first client device and the second client device with the randomly generated binary string to form a new binary string;
c) initiating, by the second client device, a binary pair (A, B) with an initial value of ($A_0$, $B_0$);
d) reading, by the second client device, a bit of the new binary string;
e) adding, by the second client device, a current value of B to A when the read bit is zero;
f) adding, by the second client device, a current value of A to B when the read bit is one;
g) reading, by the second client device, a next bit of the new binary string;
repeating, via processing circuitry, steps e) through g) until all bits of the new binary string have been read;
computing, by the second client device, a final binary pair (A, B) after all of the bits have been read;
generating, by the second client device, a first ephemeral Diffie-Hellman (DH) public key as a function of the final binary pair (A, B);
receiving, at the second client device from the first client device, a second ephemeral DH public key;
decrypting, at the second client device, the second ephemeral DH public key as a function of the final binary pair (A, B);
exchanging, between the first client device and the second client device, challenge responses based on decryption of the first and second ephemeral DH public keys;
authenticating, between the first client device and the second client device, the challenge responses;
agreeing, based on authentication of the challenge responses, on a session key for communication between the first client device and the second client device, wherein $A_i$ is a current value of A and is equal to $A_{i-1}$ when the read bit is equal to one; and
establishing a secure communication channel over the network, between the first client device and the second client device, wherein information is communicated between the first client device and the second client device over the secure communication channel based on the agreed session key.

10. The non-transitory computer-readable medium of claim 9, wherein the method is based on an addition operation applied to the binary string.

11. The non-transitory computer-readable medium of claim 9, wherein the method receives the binary string as input and generates two unique prime integers as output.

12. The non-transitory computer-readable medium of claim 9, wherein the binary string is based on an input string.

13. The non-transitory computer-readable medium of claim 9, wherein $B_i$ is a current value of B and is equal to $B_{i-1}+A_{i-1}$ when the read bit is equal to one.

14. The non-transitory computer-readable medium of claim 13, wherein $A_i$ is equal to $A_{i-1}+B_{i-1}$ when the read bit is equal to zero.

15. The non-transitory computer-readable medium of claim 14, wherein $B_i$ is equal to $B_{i-1}$ when the read bit is equal to zero.

* * * * *